United States Patent
Jain et al.

[11] Patent Number: 5,608,407
[45] Date of Patent: Mar. 4, 1997

[54] BISTATIC ANGLE-CUED RADAR SYSTEM AND PROCESSING METHOD

[75] Inventors: Atul Jain; James K. Crosby, both of Los Angeles, Calif.

[73] Assignee: Hughes Electronics, Los Angeles, Calif.

[21] Appl. No.: 423,076

[22] Filed: Apr. 17, 1995

[51] Int. Cl.$^6$ .................................................. G01S 13/46
[52] U.S. Cl. .......................................................... 342/126
[58] Field of Search ................................. 342/126, 450, 342/458, 118, 148, 154, 158; 367/99, 104

[56] References Cited

U.S. PATENT DOCUMENTS

| | | | |
|---|---|---|---|
| 2,717,380 | 9/1955 | Brooks, Jr. | 342/422 |
| 3,229,283 | 1/1966 | Hefter et al. | 342/421 |
| 3,320,615 | 5/1967 | Albright et al. | 342/453 |
| 4,370,656 | 1/1983 | Frazier et al. | 342/458 |
| 4,595,925 | 6/1986 | Hansen | 342/123 |
| 4,626,861 | 12/1986 | Wiley | 342/458 |
| 4,828,382 | 5/1989 | Vermilion | 342/453 |
| 5,371,503 | 12/1994 | Bower | 342/148 |

Primary Examiner—Ian J. Lobo
Attorney, Agent, or Firm—Leonard A. Alkov; Wanda K. Denson-Low

[57] ABSTRACT

A radar system and method employing a radar with an electronically scanned antenna array for estimating range and range rate to a target using angle cueing only. The radar transmits radar pulses at the target and searches the projection of the line-of-sight to the target on the ground for ground-bounce returns associated with each transmitted pulse. A processor coupled to the radar and processes the ground-bounce returns to determine an angle corresponding to the maximum reflected multipath ground-bounce return when the antenna array scans the ground. The angle data derived from processing the multipath ground-bounce returns permits computation of the range to and range rate of the target.

5 Claims, 2 Drawing Sheets

BISTATIC ANGLE-CUED RADAR SYSTEM AND PROCESSING METHOD

BACKGROUND

The present invention relates generally to radar systems, and more particularly, to a bistatic angle-cued radar system and processing method for estimating target range and range rate using angle cueing only.

Some airborne infrared devices, electronic warfare systems and/or advanced radar systems are capable of detecting the "presence" of an airborne low observable target and its bearing prior to conventional radar detection. However, estimates of range to the target and range rate of the target are necessary to prepare certain missiles prior to launch. Conventional systems are not capable of providing such range and range rate information.

Therefore, it is an objective of the present invention to provide for a bistatic angle-cued radar system and radar processing method that provide estimates of target range and range rate of low observable targets. It is a further objective of the present invention to provide for a bistatic angle-cued radar system and radar processing method that provide estimates of target range and range rate of low observable targets using only angle cueing.

SUMMARY OF THE INVENTION

In order to meet the above and other objectives, the present invention is a bistatic angle-cued radar system and method that estimates range and range rate to an airborne target using angle cueing only. Given certain assumptions regarding characteristics of both the radar and the target, using the principles of the present invention, it is possible to estimate target range and range rate starting with angle cueing only. It is assumed that the monostatic radar cross section (RCS) of the target is too low for direct radar detection, but that a bistatic multipath (ground-bounce) return of the target is sufficiently high so that it is detectable at operationally useful ranges. It is also assumed that the target is tuned for low monostatic re-radiation and the bistatic re-radiation is sufficiently omnidirectional to support normal multipath reception.

Given the above assumptions, and using a radar having an electronically scanned antenna array, the present invention uses the radar to transmit a radar pulse at the target and then searches the projection of the line-of-sight to the target on the ground for the ground-bounce return from that pulse. Additional pulses are transmitted and the antenna array is used to scan the ground for each respective return pulse. A maximum energy return occurs at a point where the angle of ground incidence of reflected energy from the target equals the angle of reflected energy from the ground to the radar. Consequently, a unique geometry exists and the range to the target may be calculated. A processor is coupled to the radar and determines the angle corresponding to the maximum reflected energy return (or bistatic multipath reflected return) from the target when the antenna scans the ground. The processing of the multiple multipath ground-bounce returns provides for computation of the range rate of the target. The multipath energy return includes target-induced Doppler that is used to separate it from radar ground clutter, which aids in the detection of the target.

More particularly, the present invention is a bistatic angle-cued radar system that generates signals indicative of the range to and range rate of the target using angle cueing. The system comprises a radar comprising an electronically scanned antenna array for transmitting radar pulses at the target, and a signal processor coupled to the electronically scanned antenna array. The signal processor searches a projection of the line-of-sight to the target on the ground to detect reflected ground-bounce returns, computes an angle corresponding to a peak target reflected ground-bounce return that corresponds to the multipath angle to the target, and computes the range to and range rate of the target using the multipath returns from the target and the position of the radar relative to the target.

The system computes the range to the target using the equations:

$$H_R - H_T = (X+Y) \tan \alpha, \quad H_T/H_R = Y/X, \text{ and } H_T = Y \tan \beta,$$

where the height between the ground and the radar is $H_R$, the height between the ground and the target is $H_T$, the angle between horizontal and the target is $\alpha$, the angle between horizontal and the ground is $\beta$, the distance on the ground between the radar and the bounce position of the multipath ground-bounce return is X, and the distance on the ground between the bounce position multipath ground-bounce return and the target is Y.

One method in accordance with the principles of the present invention comprises the following steps. The first step comprises transmitting a plurality of radar pulses at a target using an electronically scanned antenna array that is coupled to a radar. The next step comprises using the radar and electronically scanned antenna array to step scan and receive multipath ground-bounce returns from the target. The next step comprises processing multipath ground-bounce returns from each transmitted pulse to search a projection of the line-of-sight to the target on the ground for a multipath ground-bounce return that is the largest, and that is indicative of a multipath angle between the radar and the target. The next step comprises computing the range to the target using the known position of the radar and the multipath angle between the radar and the target. An optional step comprises computing the range rate of the target using the known position of the radar and multiple multipath angles between the radar and the target derived from the multiple multipath ground-bounce returns from the target.

Thus, the present invention provides for a system for estimating range to a target that cannot otherwise be observed directly by the radar. The processor computes the angle corresponding to the maximum target reflected energy return using the antenna to scan the ground for each return pulse. The angle data are used to compute the range to and range rate of the target. The present system and method provides data indicative of the direction and range to the target that is needed to engage the target. Other solutions currently do not exist, and consequently the present invention fulfills a critical need for low observable target detection and cueing.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
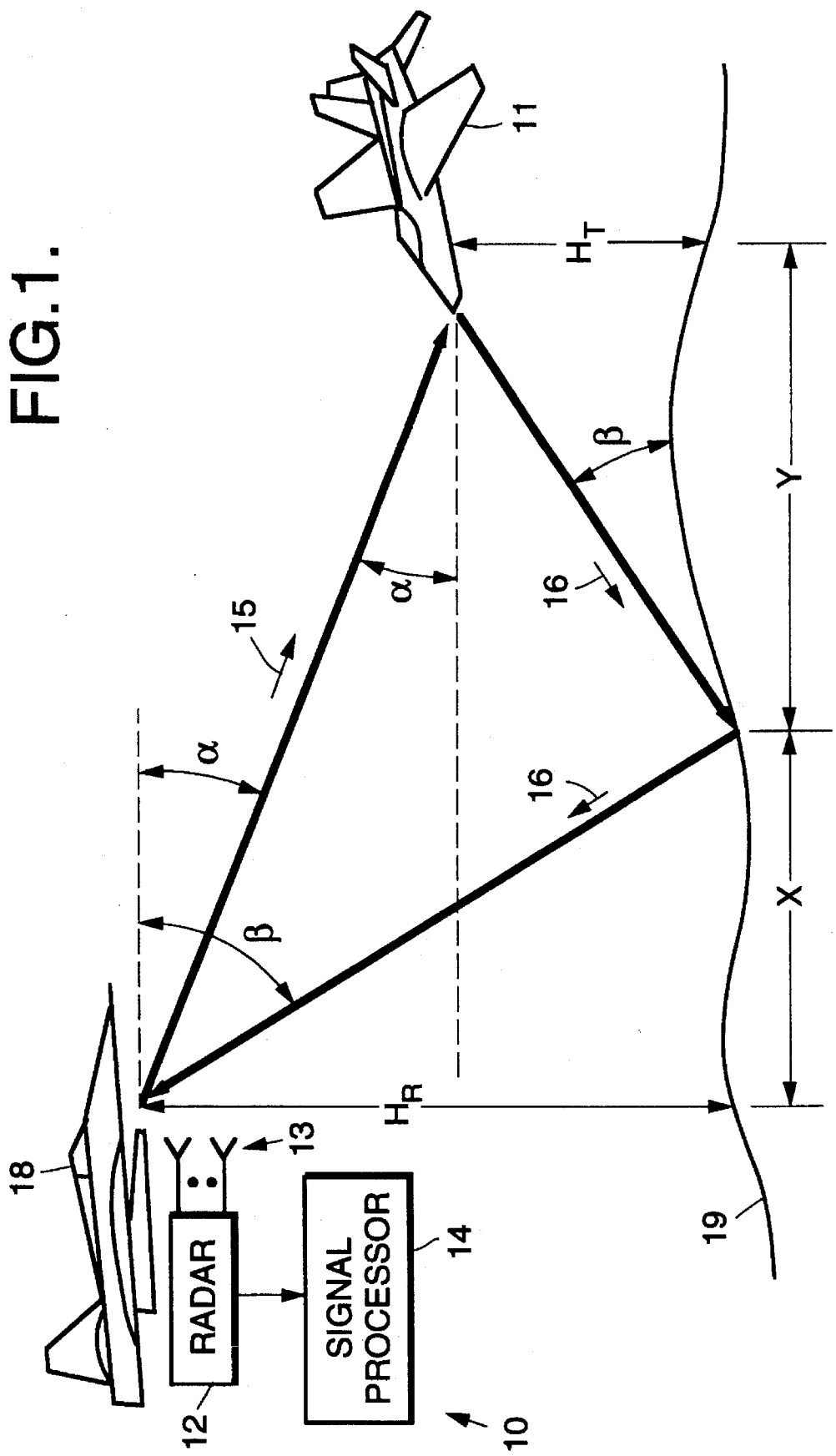
FIG. 1 shows an operational scenario illustrating the principles of a bistatic angle-cued radar system and processing method in accordance with the principles of the present invention.

Referring to the drawing figures, FIG. 1 shows an operational scenario illustrating the principles of a bistatic angle-cued target detection system 10 and processing method 20 in accordance with the principles of the present invention. The bistatic angle-cued target detection system 10 and processing method 20 are typically disposed on an aircraft 18 and generate signals indicative of range to and range rate of an airborne target 11 using angle cueing only.

The bistatic angle-cued target detection system 10 comprises a radar 12 having an electronically scanned antenna array 13 and a signal processor 14 that is coupled to the radar 12. The radar 12 is used to transmit a series of radar pulses 15 at the target 11. The radar 12 step scans to search a projection of the line-of-sight to the target 11 on the ground 19 for reflected multipath ground-bounce returns 16. That is, after each transmitted pulse 15, the antenna is caused to scan the ground for the multipath ground bounce return 16 associated with the transmitted pulse 15. A maximum energy ground-bounce return 16 occurs at a point where the angle of ground incidence of the reflected multipath ground-bounce return 16 from the target 11 equals the angle of reflected energy from the ground 19 to the radar 12. The processor 14 computes an angle corresponding to the maximum target reflected energy associated with the multipath ground-bounce return 16 when the antenna array 13 scans the ground 19. Processing of the two angle data in the processor 14 derived from the maximum energy multipath ground-bounce return 16 permits the computation of the range to the target 11. Processing of multiple ground bounce returns 16 (position integration) in the processor 14 permits determination of the range rate of the target 11. The multipath ground-bounce return 16 includes a target-induced Doppler frequency shift that is used to separate it from radar ground clutter, which aids in the detection of the target 11. Spectral separation is detected by conventional filter processing.

Thus, the present invention provides for a low observable target detection system 10 that includes a radar 12 that reports the direct angle to the target 11 and searches for a peak in scanning the ground 19 to determine the multipath angle to the target 11. The range to and range rate of the target 11 (determined by position integration) are then estimated in the processor 14 from a knowledge of the position of the radar 12 and the two angle reports.

The various angles, heights and distances between the radar 12 and the target 11 are shown in FIG. 1. Knowledge of $\alpha$, pi ($\pi$), and $H_R$ provides the values of X, Y, and $H_T$ and consequently the range to the target 11, given by the equations below. In FIG. 1, the height between the ground 19 and the radar 12 is designated $H_R$, the height between the ground 19 and the target 11 is designated $H_T$, the angle between a horizontal line at the radar 12 and the target 11 is designated $\alpha$, the angle between the horizontal line at the radar 12 and the ground 19 is designated $\beta$, the distance on the ground 19 between the radar 12 and the bounce position of the multipath ground-bounce return 16 is X, and the distance on the ground 19 between the bounce position multipath ground-bounce return 16 and the target is Y. The relevant equations that are solved in the processor 14 to compute the range to the target 11 are as follows:

$H_R - H_T = (X+Y) \tan \alpha$, $H_T/H_R = Y/X$, and $H_T = Y \tan \beta$.

Figure 2:
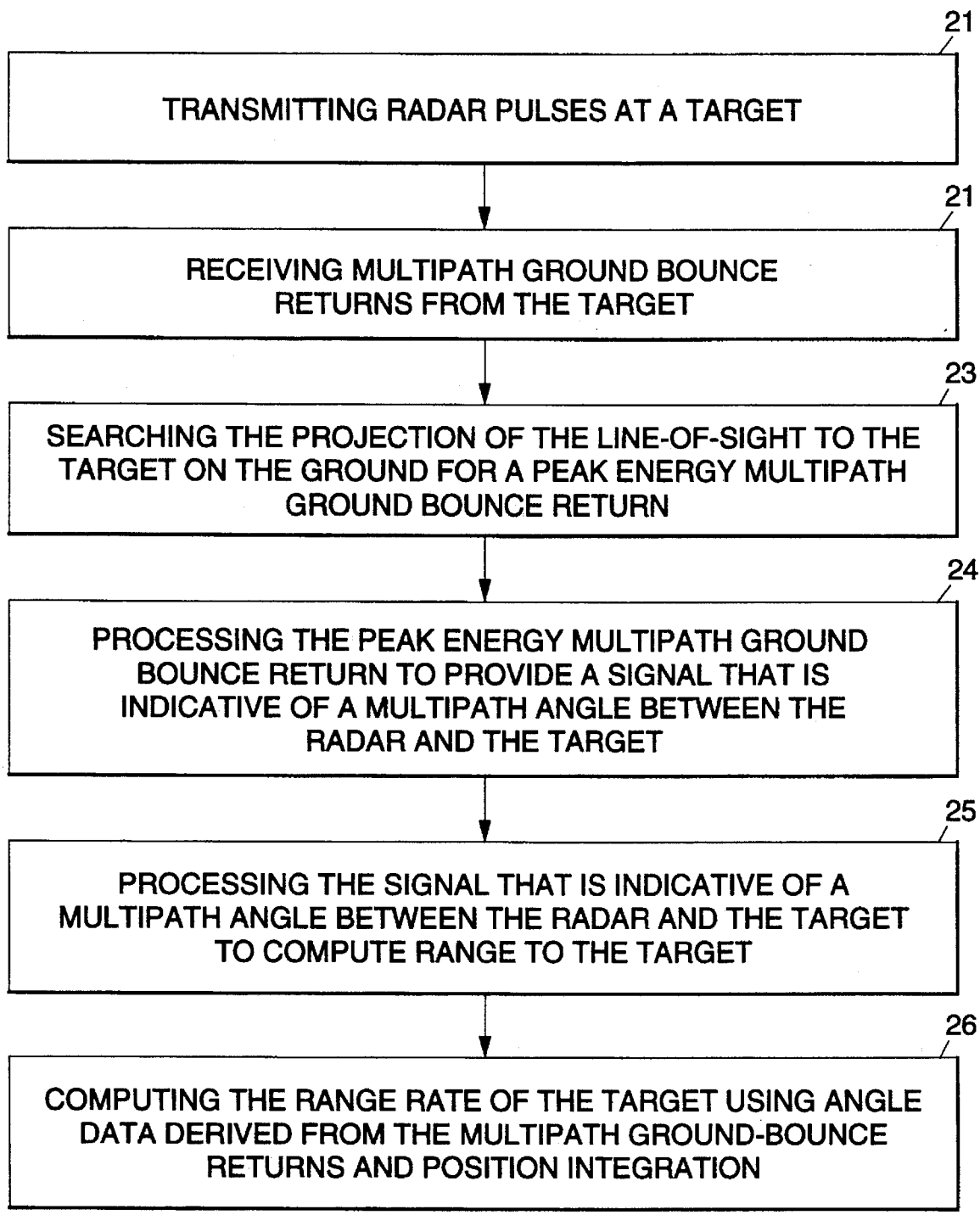
FIG. 2 is a flowchart illustrating the details of the processing method in accordance with the principles of the present invention.

Referring to FIG. 2 it shows a processing method 20 for estimating range and range rate to an airborne target 11 using angle cueing data. The processing method 20 comprises the following steps. A plurality of radar pulses 15 are transmitted at the target 11 using an electronically scanned antenna array 12 that is coupled to a radar 12, illustrated in step 21. The radar 12 then step scans to receive reflected multipath ground bounce radar returns 16 from the target 11, illustrated in step 22. A processor 12 coupled to the radar 12 then processes the received reflected multipath ground bounce radar returns 16 and searches the projection of the line-of-sight to the target 11 on the ground 19 for a maximum multipath ground-bounce return 16, illustrated in step 23.

The maximum energy return occurs at the point where the angle of ground incidence of reflected energy from the target 11 equals the angle of reflected energy from the ground 19 to the radar 12. The processor 14 processes the multipath ground-bounce return 16 to determine the angle corresponding to the maximum reflected energy return from the target 11 when the antenna array 12 scans the ground 19, illustrated in step 24. The angle data corresponding to the maximum multipath ground-bounce return 16 are used to compute the range to the target 11 in accordance with predetermined equations, illustrated in step 25. The angle data are also used to compute the range rate of the target 11 in accordance with predetermined equations, using conventional position integration, illustrated in step 26. A plurality of transmit pulses 15 are required to estimate the range rate of the target 11. The multipath ground-bounce return 16 includes target-induced Doppler that is used to separate it from radar ground clutter, which aids in the detection of the target 11.

Thus there has been described a new bistatic angle-cued radar system and processing method that provides for estimates of target range and range rate using only angle cueing. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. An angle-cued radar system that generates signals indicative of an estimate of range to a target using angle cueing only, said system comprising:

a radar comprising an electronically scanned antenna array for transmitting radar pulses at the target, and for receiving multipath ground-bounce returns from the target; and a signal processor coupled to the radar for processing the multipath ground-bounce returns received from the target, for searching a projection of the line-of-sight to the target on the ground to determine an angle corresponding to a peak target reflected ground-bounce return, which peak return corresponds to the multipath angle to the target, and for computing the range to the target using the multipath angle to the target and the position of the radar relative to the target.

2. The system of claim 1 wherein the range to the target is computed using the equations:

$$R = [(H_R - H_T)^2 + (X+Y)^2]^{1/2},$$

where $H_R - H_T = (X+Y) \tan \alpha$, $H_T/H_R = Y/X$, and $H_T = Y \tan \beta$, where the height between the ground and the radar is $H_R$, the height between the ground and the target is $H_T$, the angle between horizontal and the target is $\alpha$, the angle between horizontal and the ground is $\beta$, the distance on the ground between the radar and the bounce position of the multipath ground-bounce return is X, and the distance on the ground between the bounce position multipath ground-bounce return and the target is Y.

3. A method for estimating range to an airborne target, said method comprising the steps of:

transmitting a plurality of radar pulses at the target using an electronically scanned antenna array that is coupled to a radar;

using the radar and electronically scanned antenna array to step scan and receive multipath ground-bounce returns from the target derived from each of the transmitted pulses;

processing the received multipath ground-bounce returns to search a projection of the line-of-sight to the target on the ground for a peak multipath ground-bounce return;

processing the peak multipath ground-bounce return to provide a signal that is indicative of a multipath angle between the radar and the target; and computing range to the target using the position of the radar and the multipath angle between the radar and the target.

4. The method of claim 3 which further comprises the step of:

transmitting additional transmit pulses at the target;

receiving additional multipath ground-bounce returns from the target;

processing the received additional multipath ground-bounce returns to compute the range rate of the target.

5. The method of claim 4 wherein the range to the target is computed using the equations:

$$R = [(H_R - H_T)^2 + (X+Y)^2]^{1/2},$$

where $H_R - H_T = (X+Y) \tan \alpha$, $H_T/H_R = Y/X$, and $H_T = Y \tan \beta$, where the height between the ground and the radar is $H_R$, the height between the ground and the target is $H_T$, the angle between horizontal and the target is $\alpha$, the angle between horizontal and the ground is $\beta$, the distance on the ground between the radar and the bounce position of the multipath ground-bounce return is X, and the distance on the ground between the bounce position multipath ground-bounce return and the target is Y.

* * * * *